United States Patent
Tsuda et al.

(10) Patent No.: US 12,246,598 B2
(45) Date of Patent: Mar. 11, 2025

(54) VEHICLE DISPLAY CONTROL DEVICE, VEHICLE DISPLAY CONTROL METHOD, AND VEHICLE STORAGE MEDIUM

(71) Applicant: TOYOTA JIDOSHA KABUSHIKI KAISHA, Toyota (JP)

(72) Inventors: Hideki Tsuda, Nagoya (JP); Go Matsunobu, Okazaki (JP); Kazuhisa Ishimaru, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/530,322

(22) Filed: Dec. 6, 2023

(65) Prior Publication Data
US 2024/0239195 A1    Jul. 18, 2024

(30) Foreign Application Priority Data
Jan. 12, 2023    (JP) .................. 2023-003369

(51) Int. Cl.
| | |
|---|---|
| *G02B 27/01* | (2006.01) |
| *B60K 35/00* | (2006.01) |
| *G06V 20/58* | (2022.01) |
| *G09G 3/00* | (2006.01) |
| *B60K 35/22* | (2024.01) |
| *B60K 35/28* | (2024.01) |

(52) U.S. Cl.
CPC ............. *B60K 35/00* (2013.01); *G06V 20/58* (2022.01); *G09G 3/002* (2013.01); *B60K 35/22* (2024.01); *B60K 35/28* (2024.01); *B60K 2360/16* (2024.01); *G09G 2380/10* (2013.01)

(58) Field of Classification Search
CPC ........ B60K 35/00; G06V 20/58; G02B 27/01; G02B 27/017
See application file for complete search history.

(56) References Cited

U.S. PATENT DOCUMENTS

2018/0286094 A1   10/2018   Shishido et al.
2021/0269052 A1*   9/2021   Seo ...................... B60W 30/12

FOREIGN PATENT DOCUMENTS

WO    WO 2017/046937 A1    3/2017

\* cited by examiner

*Primary Examiner* — Roy P Rabindranath
(74) *Attorney, Agent, or Firm* — Oblon, McClelland, Maier & Neustadt, L.L.P.

(57) ABSTRACT

A vehicle display control device includes at least one processor, wherein the at least one processor is configured to: recognize an object ahead of a host vehicle; and cause display of respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction.

6 Claims, 7 Drawing Sheets

VEHICLE DISPLAY CONTROL DEVICE, VEHICLE DISPLAY CONTROL METHOD, AND VEHICLE STORAGE MEDIUM

CROSS-REFERENCE TO RELATED APPLICATION

This application is based on and claims priority under 35 USC 119 from Japanese Patent Application No. 2023-003369 filed on Jan. 12, 2023, the disclosure of which is incorporated by reference herein.

BACKGROUND

Technical Field

The present disclosure relates to a vehicle display control device, a vehicle display control method, and a vehicle storage medium.

Related Art

International Publication (WO) No. 2017/046937 discloses a vehicle display device that causes display of an image having a length in a vehicle width direction so as to be superimposed rearward of a preceding vehicle when following a preceding vehicle ahead of a host vehicle.

Moreover, International Publication (WO) No. 2017/046937 proposes that in a case in which the distance between the preceding vehicle and the host vehicle is large, the degree of emphasis of the image is increased in comparison to a case in which the distance is small, enabling the driver to easily recognize the image.

However, as in the technology described in International Publication (WO) No. 2017/046937, in a case in which an image having length in the vehicle width direction is displayed so as to be superimposed rearward of an object ahead of the vehicle, when the distance between the host vehicle and the object changes, the user easily perceives a shift in the display position of the image with respect to the object ahead of the vehicle. Moreover, as the distance between the host vehicle and the object increases, there are cases in which the user is given a sense of discomfort such as the image appearing to float at a position ahead of the object due to limitations in the rendering performance of perspective.

SUMMARY

In consideration of the above facts, an object of the present disclosure is to provide a vehicle display control device, a vehicle display control method, and a vehicle storage medium which are capable of reducing a sense of discomfort of a user in a case in which a superimposed image is displayed so as to be superimposed on an object ahead of a host vehicle.

A vehicle display control device according to a first aspect of the present disclosure includes: a recognition section that is configured to recognize an object ahead of a host vehicle; and a display control section that is configured to cause display of respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction.

In the vehicle display control device according to the first aspect of the present disclosure, respective superimposed images, having lengths in the vehicle vertical direction, are displayed at each side of a recognized object in the vehicle width direction so as to be superimposed on a view ahead of the host vehicle, the superimposed images being spaced apart from each other in the vehicle width direction. This enables the user to hardly perceive a shift in the display position of the superimposed images with respect to the object ahead of the host vehicle when the distance between the host vehicle and the object changes. Moreover, since the superimposed images, which have lengths in the vehicle vertical direction, are long in a depth direction of the displayed image, the user is less likely to perceive limitations in the rendering performance of perspective. As a result, it is difficult to give a visual effect such as the superimposed images appearing to float at a position ahead of the object. In this manner, the vehicle display control device can reduce a sense of discomfort of the user in a case in which the superimposed images are displayed so as to be superimposed on an object located ahead of the host vehicle.

A vehicle display control device according to a second aspect of the present disclosure is the configuration of the vehicle display control device according to the first aspect, wherein: the display control section is configured to change a distance between the respective superimposed images displayed at each side of the object in the vehicle width direction in accordance with a distance between the host vehicle and the object.

In the vehicle display control device according to the second aspect of the present disclosure, a distance between the respective superimposed images displayed at each side of the object in the vehicle width direction is changed in accordance with a distance between the host vehicle and the object. For example, since the greater the distance to an object ahead of the vehicle, the smaller the object appears from the position of the host vehicle, the distance between the respective superimposed images displayed at each side of the object in the vehicle width direction is changed so as to be smaller. This enables the user to easily intuitively perceive a change in the distance between the host vehicle and the object, enabling the rendering performance of perspective to be improved.

A vehicle display control device according to a third aspect of the present disclosure is the configuration of the vehicle display control device according to the first aspect or the second aspect, wherein: the display control section is configured to cause display of the lengths of the superimposed images in the vehicle vertical direction to be constant, regardless of a distance between the host vehicle and the object.

The vehicle display control device according to the third aspect of the present disclosure displays the lengths of the superimposed images in the vehicle vertical direction to be constant, regardless of a distance between the host vehicle and the object. This enables the consistency of display to be maintained, enabling the user to easily understand an object ahead of the host vehicle based on the display of the superimposed images.

A vehicle display control method according to a fourth aspect of the present disclosure includes: recognizing an object ahead of a host vehicle; and displaying respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction.

A vehicle display control program according to a fifth aspect of the present disclosure causes a computer to perform processing, the processing including: recognizing an object ahead of a host vehicle; and displaying respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction.

As described above, the vehicle display control device, the vehicle display control method, and the vehicle display control program according to the present disclosure can reduce the sense of discomfort of a user in a case in which a superimposed image is displayed so as to be superimposed on an object ahead of the host vehicle.

BRIEF DESCRIPTION OF THE DRAWINGS

Exemplary embodiments of the present disclosure will be described in detail based on the following figures, wherein.

DETAILED DESCRIPTION

Explanation follows regarding a vehicle 12 to which a vehicle display control device 10 according to an exemplary embodiment has been applied, with reference to FIG. 1 to FIG. 7.

Figure 1:
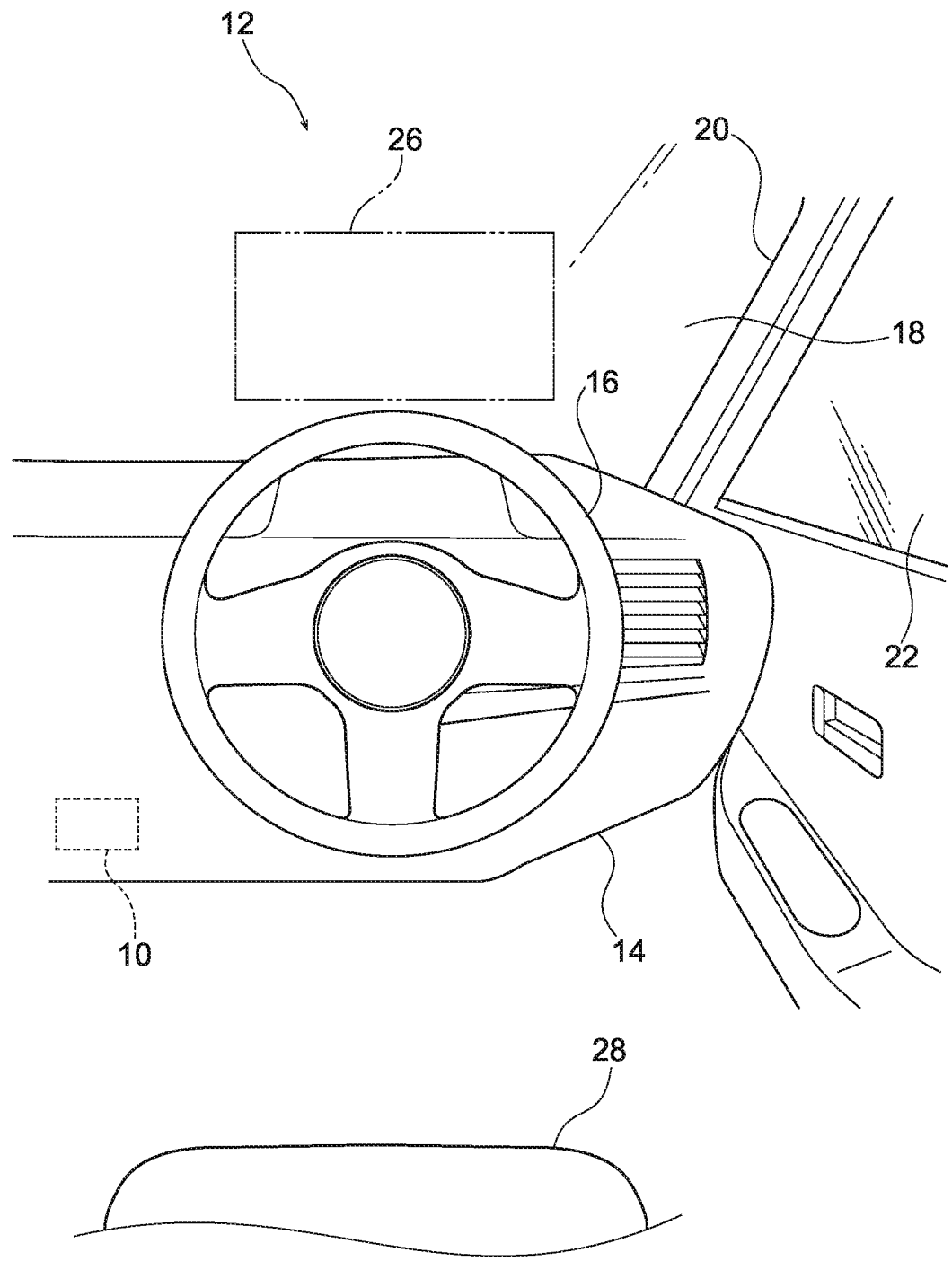
FIG. 1 is a schematic diagram illustrating a front part inside a vehicle cabin, viewed from a vehicle rearward side, of a vehicle to which a vehicle display control device according to an exemplary embodiment of the present disclosure has been applied.

As illustrated in FIG. 1, an instrument panel 14 is provided at a front part inside a vehicle cabin of the vehicle 12. The instrument panel 14 extends in the vehicle width direction, and a steering wheel 16 is provided at a vehicle right side of the instrument panel 14. Namely, in the present exemplary embodiment, as an example, a right hand drive vehicle is configured with a steering wheel 16 provided on the right side, and a driver's seat 28 is installed on the right side of the vehicle.

A windshield glass 18 is provided at a front end part of the instrument panel 14. The windshield glass 18 extends in the vehicle vertical direction and the vehicle width direction to partition the vehicle cabin interior from an exterior of the vehicle cabin.

In front of the driver's seat 28, the windshield glass 18 is provided with a head-up display area 26 (hereafter simply referred to as the "display area 26"). The display area 26 is configured by a projection plane that is projected by a head-up display device 48 (see FIG. 2) serving as a vehicle display device. More specifically, the head-up display device 48 is provided at a vehicle front side of the instrument panel 14, and an image is projected onto the display area 26 of the windshield glass 18 from the head-up display device 48. Namely, the display area 26 is a part of the windshield glass 18 serving as a projection plane of the head-up display device 48.

Note that the vehicle 12 is provided with a vehicle display control device 10. The vehicle display control device 10 of the present exemplary embodiment is configured by, for example, one or more electronic control units (ECUs).

Hardware Configuration of the Vehicle Display Control Device 10

Figure 2:
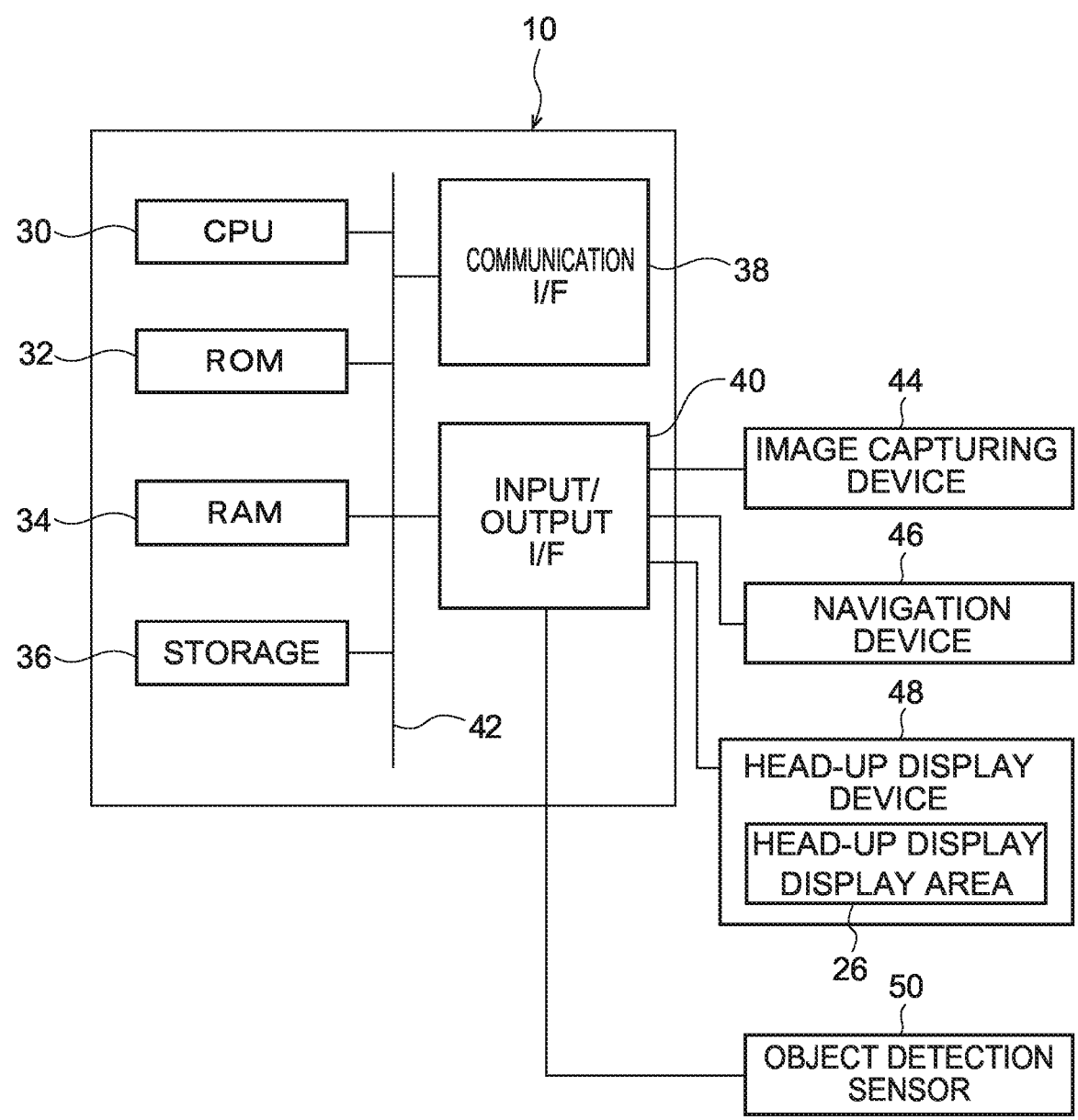
FIG. 2 is a block diagram illustrating a hardware configuration of a vehicle display control device according to an exemplary embodiment of the present disclosure.

FIG. 2 is a block diagram illustrating a hardware configuration of the vehicle display control device 10. As illustrated in FIG. 2, the vehicle display control device 10 includes a central processing unit (CPU; serving as a processor) 30, read only memory (ROM) 32, random access memory (RAM) 34, storage 36, a communication interface (communication I/F) 38, and an input/output interface (input/output I/F) 40. These respective configurations are communicably connected to each other via an internal bus 42.

The CPU 30 is a central processing unit that executes various programs and controls various components. Namely, the CPU 30 reads a program from the ROM 32 or the storage 36, and executes the program using the RAM 34 as a workspace. The CPU 30 controls the respective configurations described above and performs a variety of computation processing in accordance with programs stored in the ROM 32 or the storage 36.

The ROM 32 stores various programs and various data. The RAM 34 serves as a workspace to temporarily store programs and data. The storage 36 is configured by a hard disk drive (HDD) or a solid state drive (SSD), and stores various programs including an operating system, as well as various data.

The communication I/F 38 is an interface for the vehicle display control device 10 to communicate with an external server and other devices and, for example, a protocol such as a controller area network (CAN), Ethernet (registered trademark), long term evolution (LTE), a fiber distributed data interface (FDDI), or Wi-Fi (registered trademark) is used.

The input/output I/F 40 is electrically connected to an image capturing device 44, a navigation device 46, the head-up display device 48, and an object detection sensor 50.

The image capturing device 44 is configured by, for example, an onboard camera, and captures the surroundings (forward, rearward, and sides) of the vehicle 12. The navigation device 46 includes a non-illustrated global positioning system (GPS) sensor and map data, and structures a known navigation system. The navigation device 46 identifies a current position of the vehicle 12 based on a signal from a global positioning system (GPS) sensor, and, based on map data, sets a travel path from the current position of the vehicle 12 to a destination set by a user.

The head-up display device 48 causes display of predetermined information at the display area 26 of the windshield glass 18. The information displayed by the head-up display device 48 includes a superimposed image. The superimposed image is an AR image. The AR image is an image that is drawn using augmented reality technology. Namely, the view ahead of the vehicle 12 is visible at the display area 26 through the windshield glass 18, and a superimposed image is displayed superimposed on this view. The information displayed as the superimposed image includes path information relating to the travel path set by the navigation device 46 and information relating to a driving system during operation. In the present exemplary embodiment, in particular, a superimposed image indicating the position of an object that is present ahead of the vehicle 12 is displayed at the display area 26.

The object detection sensor 50 detects an object present in the periphery of the vehicle 12. The object detection sensor 50 can be configured by, for example, one or a combination of well-known sensors typified by an onboard camera, an ultrasonic sensor, a millimeter-wave radar, a LIDAR sensor, or the like.

Functional Configuration of the Vehicle Display Control Device 10

The vehicle display control device 10 implements various functions using the above-described hardware resources. Explanation follows regarding functional configurations implemented by the vehicle display control device 10, with reference to FIG. 3.

Figure 3:
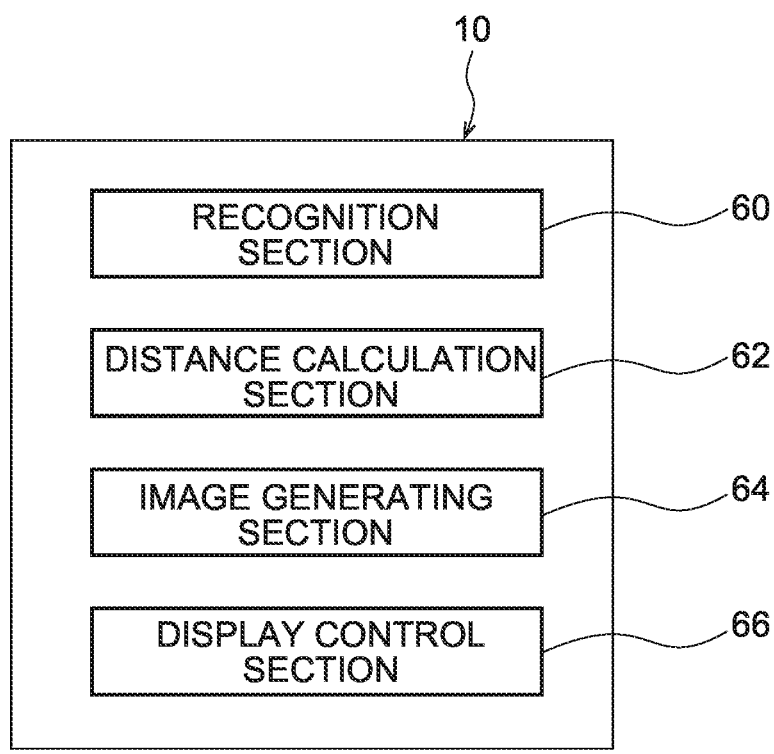
FIG. 3 is a block diagram illustrating a functional configuration of a vehicle display control device according to an exemplary embodiment of the present disclosure.

As illustrated in FIG. 3, the functional configurations of the vehicle display control device 10 includes a recognition section 60, a distance calculation section 62, an image generating section 64, and a display control section 66. The respective functional configurations are implemented by the CPU 30 reading and executing programs stored in the ROM 32 or the storage 36.

The recognition section 60 recognizes an object that is present ahead of the vehicle 12 based on peripheral information of the vehicle 12. As an example, the recognition section 60 acquires peripheral information based on an image capturing ahead of the vehicle 12, which is captured using the image capturing device 44, and recognizes an object that is present ahead of the vehicle 12. The recognition section 60 recognizes, for example, a vehicle such as a four-wheel vehicle or a two-wheel vehicle, a bicycle, a pedestrian, or the like, as an object. In the present exemplary embodiment, the recognition section 60 recognizes an object that is present in a travel lane of the vehicle 12.

Moreover, the recognition section 60 recognizes a travel lane of the vehicle 12. More specifically, the recognition section 60 recognizes a travel lane from a boundary such as a partition line, asphalt, grass, soil, or a curb, based on an image capturing ahead of the vehicle 12, which is captured using the image capturing device 44.

The distance calculation section 62 calculates a distance between the vehicle 12 and an object ahead of the vehicle 12. As an example, the distance calculation section 62 calculates a distance between the vehicle 12 and an object ahead of the vehicle 12 based on a signal received from the object detection sensor 50.

The image generating section 64 generates a superimposed image that is displayed at the display area 26. The superimposed image is displayed so as to be superimposed on the object recognized by the recognition section 60 in a case in which the object is viewed through the display area 26. The superimposed image is displayed so as to indicate, to the user, the position of the object that is present ahead of the vehicle 12. This superimposed image is displayed during operation of a driving system typified by a known advanced driving assistant system (ADAS), such as a stop system or a start system for avoiding contact between a detected object and the vehicle 12, an adaptive cruise control (ACC) system, a lane tracing assistance (LTA) system, or a lane change assistance (LCA) system.

Note that the superimposed image is configured by two respective images, displayed so as to be spaced apart from each other in the vehicle width direction, at each side of an object ahead of the vehicle. The respective images are designed to have lengths in the vehicle vertical direction. For example, as illustrated in FIG. 4, the superimposed image 80 is configured by an image in which respective linear images having lengths in the vehicle vertical direction are displayed so as to be spaced apart from each other in the vehicle width direction at each side of an object (vehicle ahead V). Note that the design of the superimposed image 80 is merely an example, and various embodiments can be implemented. The superimposed image according to the present disclosure is not limited to a pair of linear images, as long as it is an embodiment in which respective superimposed images have lengths in the vehicle vertical direction at each side of the object in the vehicle width direction, as in the illustrated example. Note that the case referred to herein as "having lengths in the vehicle vertical direction" is a broad concept including a case in which the superimposed images have lengths in a direction inclined with respect to an actual vehicle vertical direction.

In a case in which plural objects are present ahead of the vehicle 12, the image generating section 64 recognizes the plural objects as one superimposition target and causes display of the superimposed images according to a predetermined condition. Namely, as illustrated in FIG. 5, respective superimposed images having lengths in the vehicle vertical direction are displayed spaced apart from each other at each side of plural objects (two-wheel vehicles B1 and B2) in the vehicle width direction. More specifically, in a case in which plural objects are present ahead of the vehicle 12 in a range in which a distance L to the vehicle 12 is less than a first distance L1, the image generating section 64 recognizes the plural objects as a single superimposition target. The image generating section 64 then generates respective superimposed images displayed at each side of the plural objects in the vehicle width direction. Moreover, after displaying the respective superimposed images at each side of the plural objects, in a case in which at least one of the plural objects moves in a direction away from the vehicle 12, under a condition in which the distance L between the object and the vehicle 12 is equal to or greater than the first distance L1 and less than a second distance L2, the image generating section 64 continuously recognizes the plural objects as a single superimposition target. For example, the first distance L1 is set to 30 m, and the second distance L2 is set to 50 m.

The display control section 66 causes display of the superimposed images generated by the image generating section 64 at the display area 26 so as to be superimposed on a view ahead of the vehicle. Namely, the display control section 66 causes display of the respective superimposed images, having lengths in the vehicle vertical direction, at each side of the object, recognized by the recognition section 60, in the vehicle width direction, the superimposed images being spaced apart from each other in the vehicle width direction. The superimposed images having lengths in the vehicle vertical direction are images that are long in the depth direction of the display area 26 when viewed from a user seated in the driver's seat 28. Accordingly, the superimposed images having lengths in the vehicle vertical direction are a design that makes it difficult to perceive a shift in the display position of the superimposed images as compared to a case in which an image that is long in the vehicle width direction is displayed superimposed on an object, and also enables the rendering performance of perspective to be improved.

The display control section 66 changes the distance between the respective superimposed images displayed at each side of the object in the vehicle width direction in accordance with the distance between the host vehicle and the object. More specifically, the greater the distance between the host vehicle and the object, the smaller the distance between the respective superimposed images displayed at each side of the object in the vehicle width direction. This enables the superimposed images to be displayed in accordance with the size of the object that decreases as the distance from the host vehicle increases.

Moreover, the display control section 66 causes display of the lengths of the superimposed images in the vehicle vertical direction to be constant regardless of the distance between the host vehicle and the object. Accordingly, when an object becomes further away from the host vehicle, the distance between the respective images displayed at each side of the object in the vehicle width direction becomes smaller as a whole in the superimposed image, while keeping the length in the vehicle vertical direction constant enables display consistency to be maintained.

Figure 4A:
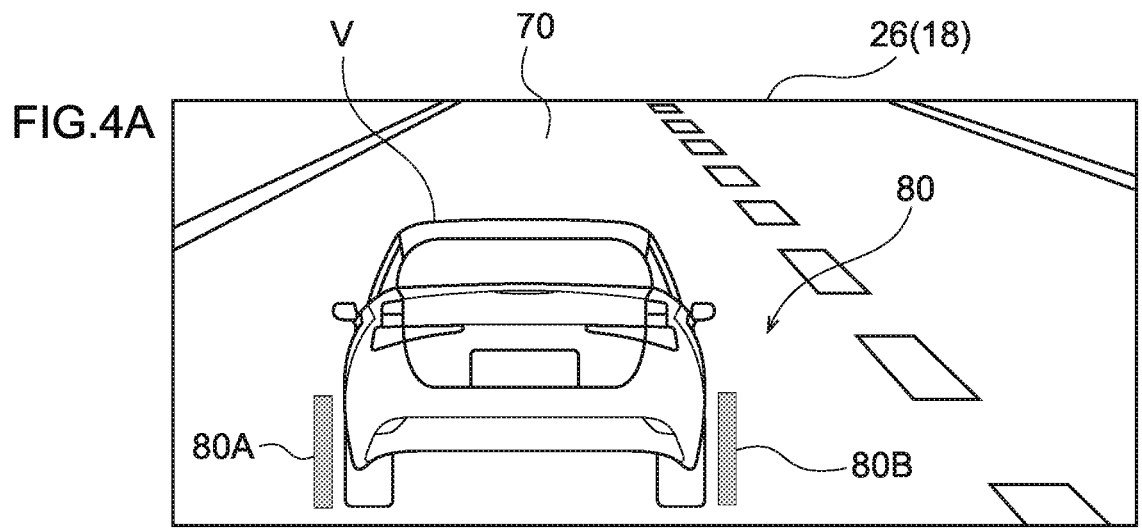
FIG. 4A is a diagram illustrating an example in which a distance between superimposed images in the vehicle width direction is changed in accordance with a distance between a host vehicle and an object, and illustrates a state in which a distance between a host vehicle and a vehicle ahead is short.
Figure 4B:
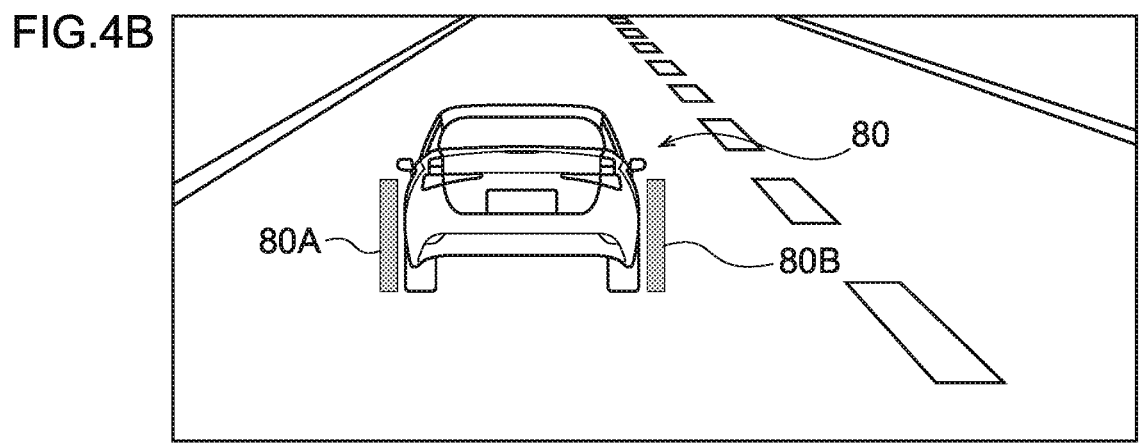
FIG. 4B is a diagram illustrating an example in which a distance between superimposed images in the vehicle width direction is changed in accordance with a distance between a host vehicle and an object, and illustrates a state in which a distance between a host vehicle and a vehicle ahead is greater than the state illustrated in FIG. 4A.
Figure 4C:
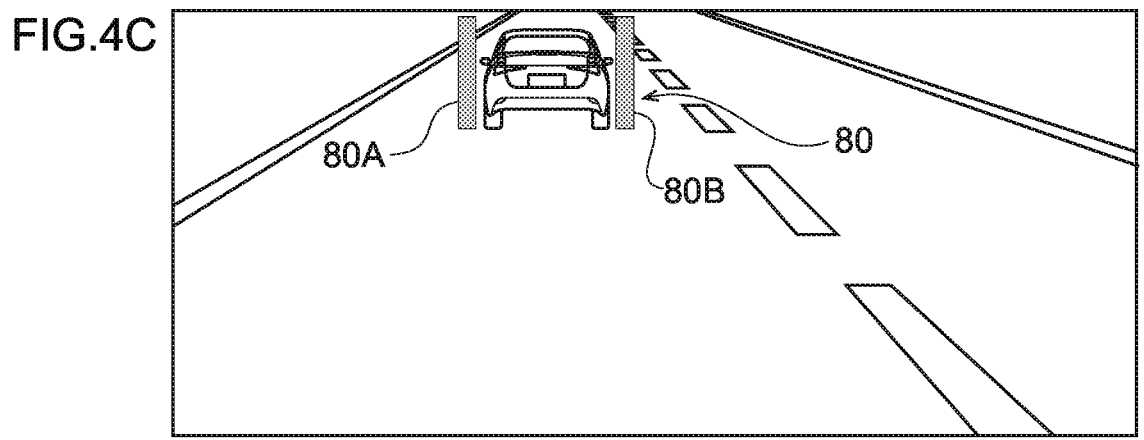
FIG. 4C is a diagram illustrating an example in which a distance between superimposed images in the vehicle width direction is changed in accordance with a distance between a host vehicle and an object, and illustrates a state in which a distance between a host vehicle and a vehicle ahead is greater than the state illustrated in FIG. 4B.

Explanation follows regarding an example, with reference to FIG. 4A to FIG. 4C. FIG. 4A to FIG. 4C illustrate a display area 26 provided at the windshield glass 18. As illustrated in these figures, a vehicle ahead V that is detected as an object present ahead of the vehicle 12 is visible through the windshield glass 18 through the display area 26. Further, the superimposed image 80 is displayed at the display area 26 so as to be superimposed on the vehicle ahead V. The superimposed image 80 is displayed so that images 80A and 80B, which have lengths in the vehicle vertical direction, are arranged spaced apart from each other at each side of the vehicle ahead V in the vehicle width direction. As illustrated in FIG. 4A to FIG. 4C, the superimposed image 80 changes so as to decrease the distance between the images 80A and 80B in the vehicle width direction as the vehicle ahead V becomes further away. On the other hand, regardless of the distance between the vehicle 12 and the vehicle ahead V, the lengths of the images 80A and 80B in the vehicle vertical direction are displayed with a constant length.

Figure 5A:
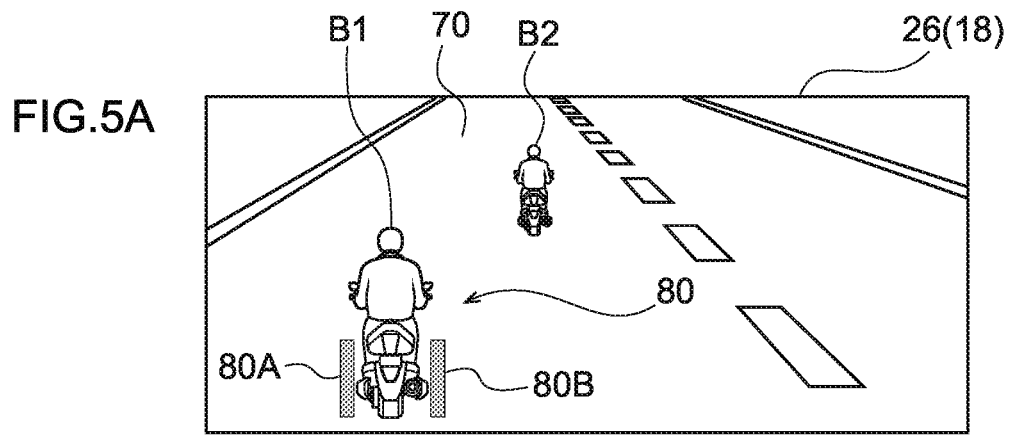
FIG. 5A is an example of display of superimposed images in a case in which plural objects are present ahead of a host vehicle, and illustrates a case in which one object is present within a first distance L1 from the host vehicle.
Figure 5B:
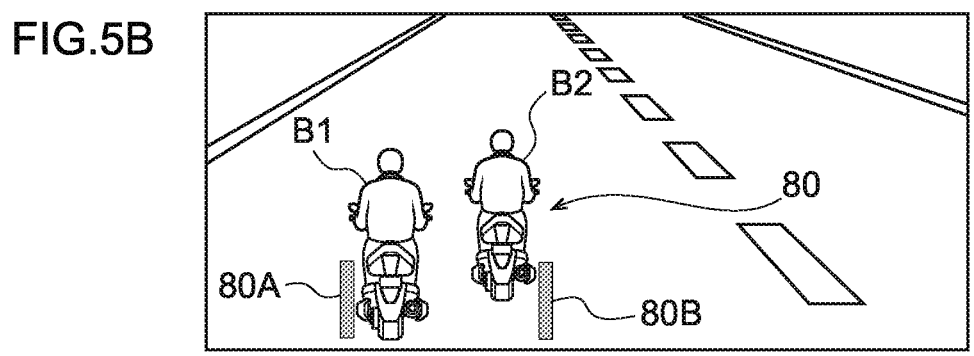
FIG. 5B is a diagram illustrating an example in which a distance between superimposed images in the vehicle width direction is changed in accordance with a distance between a host vehicle and an object, and illustrates a case in which plural objects are present within a first distance L1 from the host vehicle.
Figure 5C:
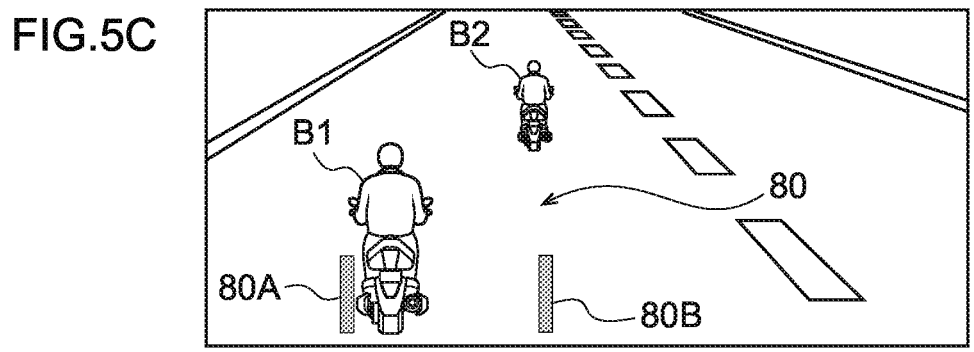
FIG. 5C is a diagram illustrating an example in which a distance between superimposed images in the vehicle width direction is changed in accordance with a distance between a host vehicle and an object, and illustrates a case in which plural objects are present within a second distance L2 from the host vehicle.
Figure 5D:
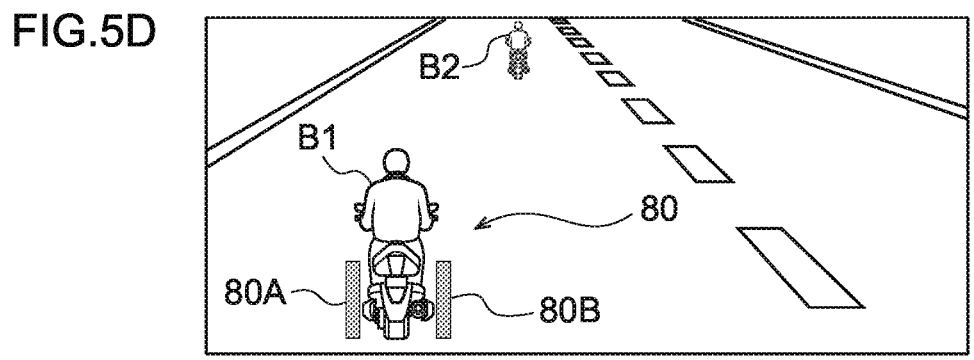
FIG. 5D is a diagram illustrating an example in which a distance between superimposed images in the vehicle width direction is changed in accordance with a distance between a host vehicle and an object, and illustrates a case in which one object is present within a second distance L2 from the host vehicle.

As illustrated in FIG. 5A to FIG. 5D, in a case in which plural objects are present ahead of the vehicle 12, the display control section 66 recognizes the plural objects as a single superimposition target according to a predetermined condition, and causes display of the superimposed image 80. For example, in FIG. 5A, a single two-wheel vehicle B1 is present in a range in which a distance L to the vehicle 12 is less than the first distance L1 (=30 m) in a travel lane 70 of the vehicle 12. Further, a single two-wheel vehicle B2 is present in a range in which a distance L to the vehicle 12 is equal to or greater than the first distance L1 and less than the second distance L2 (=50 m). In this case, the display control section 66 recognizes only the one two-wheel vehicle B1 as a superimposition target, and causes display of the respective superimposed images 80 at each side of the two-wheel vehicle B1 in the vehicle width direction. Moreover, as illustrated in FIG. 5B, in a case in which the two-wheel vehicle B2 approaches the vehicle 12 and the two two-wheel vehicles B1 and B2 are present in a range in which the distance L to the vehicle 12 is less than the first distance L1, the two two-wheel vehicles B1 and B2 are recognized as a single superimposition target. As a result, the display control section 66 causes display of the respective superimposed images 80 at each side of the two two-wheel vehicles B1 and B2 in the vehicle width direction. Then, when the single two-wheel vehicle B2 become further away from the vehicle 12 by the first distance L1 or more, as illustrated in FIG. 5C, in a case in which the two two-wheel vehicles B1 and B2 are present in a range that is equal to or greater than the first distance L1 and that is less than the second distance L2 from the vehicle 12, the respective superimposed images 80 are displayed at each side of the two two-wheel vehicles B1 and B2 in the vehicle width direction. As illustrated in FIG. 5D, after the at least one two-wheel vehicle B2 become further away from the vehicle 12 by the second distance L2 or greater, the two-wheel vehicle B1 is recognized as a superimposition target again, and the respective superimposed image 80 are displayed at each side of the two-wheeled vehicle B1 in the vehicle width direction. As described above, in a case in which plural objects are detected ahead of the vehicle 12, hysteresis is imparted to the display of the superimposed image, and the complexity felt by the user can be reduced by frequently changing the superimposition target.

Operation of Display Processing

Figure 6:
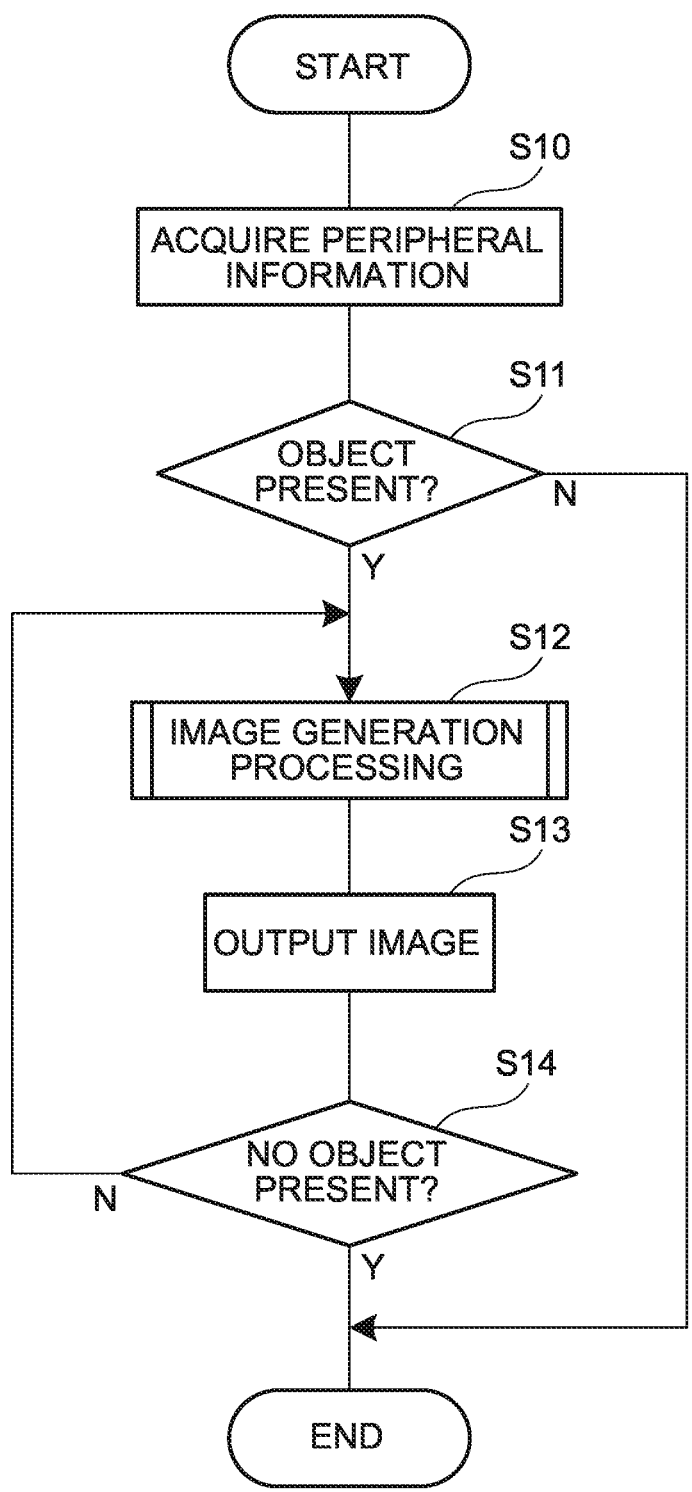
FIG. 6 is a flowchart illustrating an example of a flow of display processing in an exemplary embodiment of the present disclosure.

Explanation follows regarding an example of operation of display processing executed by the vehicle display control device 10, with reference to the flowchart illustrated in FIG. 6. The display processing is executed by the CPU 30 reading a program from the ROM 32 or the storage 36 and loading the program in the RAM 34.

As illustrated in FIG. 6, at step S10, the CPU 30 acquires peripheral information for the vehicle 12. More specifically, the image capturing device 44 acquires an image capturing ahead of the vehicle 12.

At step S11, based on a signal from the object detection sensor 50, the CPU 30 determines whether or not an object is present ahead of the vehicle 12. In a case in which an object is present, the determination of step S11 is affirmative, and the CPU 30 proceeds to the processing of step S12. On the other hand, in a case in which no object is present, the determination at step S11 is negative, and the CPU 30 ends the display processing.

At step S12, the CPU 30 executes image generation processing to generate a superimposed image. The image generation processing is described below.

At step S13, the CPU 30 outputs the image generated by the image generation processing. More specifically, the CPU 30 transmits the generated image data to the head-up display device 48, and the transmitted image data is output by the head-up display device 48 so as to be displayed at the display area 26.

At step S14, the CPU 30 determines whether or not an object is no longer present ahead of the vehicle 12. A case in which an object is no longer present, also includes a case in which the object detection sensor 50 no longer detects an object following a stop of the corresponding driving system. In a case in which an object is no longer present ahead of the vehicle 12, the determination at step S14 is affirmative, and the CPU 30 ends the display processing. In a case in which an object is present ahead of the vehicle 12, the CPU 30 returns to the processing of step S12.

Image Generation Processing

Figure 7:
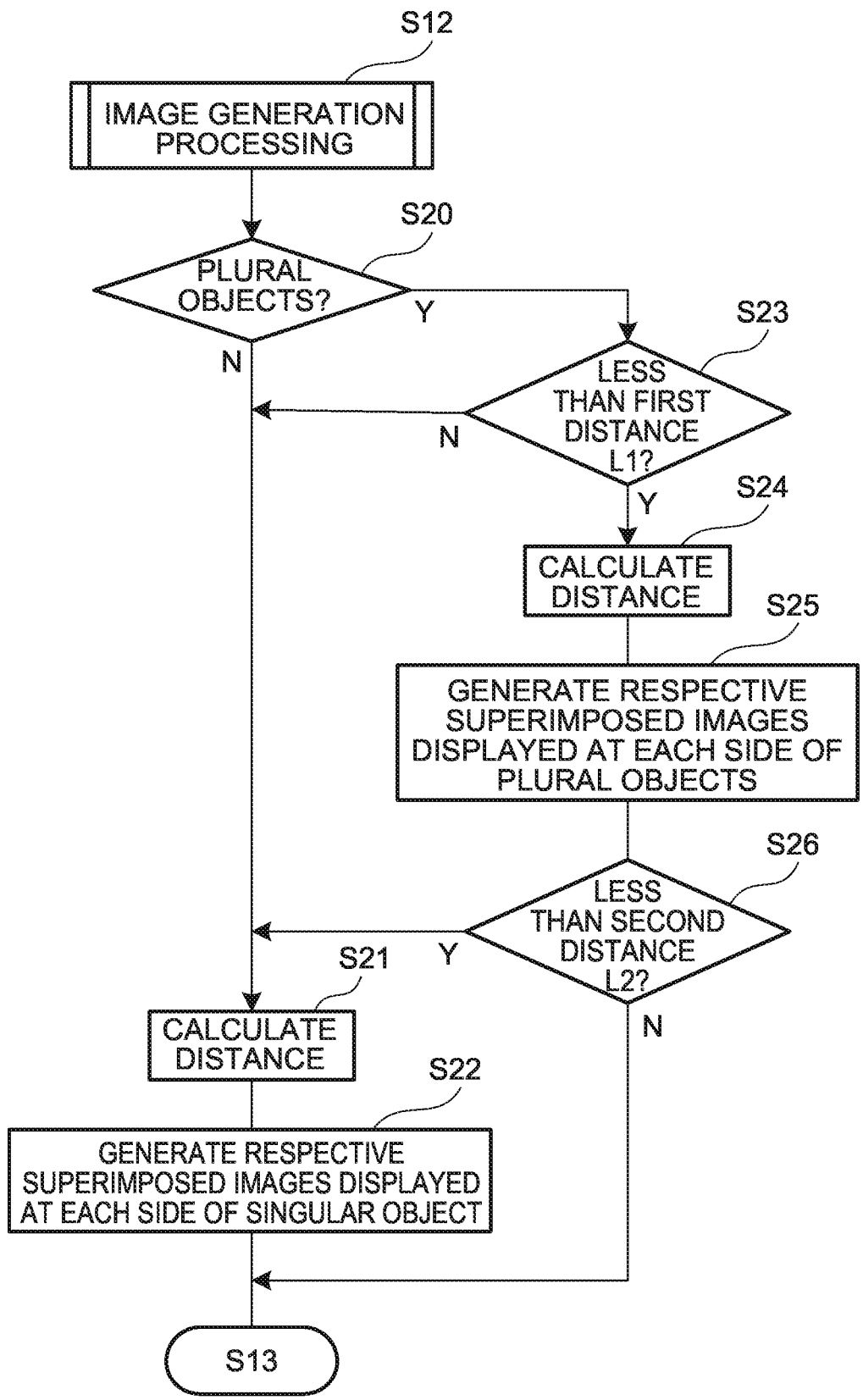
FIG. 7 is a flowchart illustrating an example of a flow of image generation processing illustrated in FIG. 6.

Next, explanation follows regarding an example of operation of the image generation processing, with reference to FIG. 7. As illustrated in this figure, at step S20, the CPU 30 determines whether or not plural objects are present ahead of the vehicle 12. In a case in which plural objects are present, the determination at step S20 is affirmative, and the processing proceeds to step S23 which is described below. On the other hand, in a case in which plural objects are not present, namely, in a case in which one object (singular object) is present, the determination of step S20 is negative, and the CPU 30 proceeds to the processing of step S21.

At step S21, the CPU 30 calculates the distance L between the vehicle 12 and the object ahead.

At step S22, the CPU 30 generates respective superimposed images arranged at each side of a singular object, in the vehicle width direction, which are present ahead of the vehicle 12. More specifically, as illustrated in FIG. 4A and FIG. 5A, the CPU 30 generates a superimposed image 80 in which respective superimposed images 80A and 80B having lengths in the vehicle vertical direction are spaced apart from each other at each side of a single object (V, B1), ahead of the vehicle 12, in the vehicle width direction.

The superimposed image 80 generated at step S22 is as illustrated in FIG. 4A to FIG. 4C. The distance between the respective superimposed images 80A and 80B, which are displayed at each side of the singular object in the vehicle width direction, changes in accordance with the distance between the vehicle 12 and the singular object (V). On the other hand, the superimposed image 80 is displayed with a length of the superimposed image 80 (80A, 80B) in the vehicle vertical direction constant regardless of the distance L between the vehicle 12 and the singular object. Note that as an example, the length of the superimposed image 80 (80A, 80B) in the vehicle vertical direction is set with reference to at least one of the distance L between the vehicle 12 and the object, or the size of the object.

Next, explanation follows regarding a case in which it is determined at step S20 that plural objects are present ahead of the vehicle 12, and the processing proceeds to step S23. At step S23, the CPU 30 determines whether or not plural objects are present in a range in which the distance L to the vehicle 12 is less than the first distance L1 (=30 m). In a case in which plural objects are present in a range that is less than the first distance L1, the determination of step S23 is affirmative, and the CPU 30 proceeds to the processing of step S24. On the other hand, in a case in which the determination at step S23 is negative, the processing proceeds to step S21. In this case, after the processing of the following step S22, as illustrated in FIG. 5A, a superimposed image 80 is generated which is superimposed on an object (two-wheel vehicle B1) closest to the vehicle 12.

At step S24, the CPU 30 recognizes plural objects as a single superimposition target, and calculates the distance between the vehicle 12 and the plural objects. For example, from among the plural objects, an object with a distance L that is closest to the vehicle 12 is calculated.

At step S25, as illustrated in FIG. 5B, the CPU 30 generates respective superimposed images 80 arranged at each side of plural objects (two two-wheel vehicles B1 and B2) which are present ahead of the vehicle 12.

At step S26, the CPU 30 determines whether or not the plural objects that generated the superimposed image 80 at step S25 are present in a range in which the distance L to the vehicle 12 is equal to or greater than the first distance L1 and less than the second distance L2 (=50 m). In a case in which the plural objects are present within a range that is equal to or greater than the first distance L1 and less than the second distance L2 from the vehicle 12, the determination at step S26 is affirmative, and the CPU 30 proceeds to the processing at step S13 of the display processing. Accordingly, as illustrated in FIG. 5C, even in a case in which a single two-wheel vehicle B2 serving as an object ahead of the vehicle has become further away from the vehicle 12 by a first distance L1 or greater, display of the respective superimposed images 80 arranged at each side of the two two-wheel vehicles B1 and B2 in the vehicle width direction continues at the display area 26.

On the other hand, in a case in which the plural objects are not present within the range equal to or greater than the first distance L1 and less than the second distance L2 from the vehicle 12 at step S26, the determination at step S26 is negative, and the CPU 30 proceeds to the processing at step S21. Accordingly, as illustrated in FIG. 5D, the CPU 30 recognizes only one two-wheel vehicle B1 that is closest to the vehicle 12 as a superimposition target, and generates respective superimposed images 80 arranged at each side of the two-wheel vehicle B1 in the vehicle width direction.

As described above, the vehicle display control device 10 according to the present exemplary embodiment causes display of respective superimposed images having lengths in the vehicle vertical direction, at each side in the vehicle width direction of an object that is present ahead of the vehicle 12, so as to be superimposed on a view ahead of the vehicle 12 (host vehicle), the superimposed images being spaced apart from each other in the vehicle width direction. As a result, as illustrated in FIG. 4, when the distance between the vehicle 12 and the object changes, the user hardly perceives a shift in the display position of the superimposed image 80 with respect to the object ahead of the vehicle 12. Moreover, since the superimposed images 80 having lengths in the vehicle vertical direction are long in the depth direction of the display image, the user is less likely to perceive limitations in the rendering performance of perspective. As a result, it is difficult to give a visual effect such as the superimposed image 80 appearing to float at a position ahead of the object in a case in which the object is distant from the vehicle 12. In this manner, the vehicle display control device 10 can reduce the sense of discomfort of the user in a case in which the superimposed image is displayed so as to be superimposed on an object located ahead of the host vehicle.

Moreover, in the present exemplary embodiment, the distance between the respective superimposed images 80 displayed at each side of the object in the vehicle width direction is changed in accordance with the distance between the host vehicle and the object. As illustrated in FIG. 4, the greater the distance to the object ahead of the vehicle 12, the smaller the object that is visible from the position of the vehicle 12, and therefore, the distance between the respective superimposed images 80 (80A, 80B) displayed at each side of the object in the vehicle width direction is changed so as to be smaller. This enables the user to easily intuitively perceive a change in the distance between the vehicle 12 and the object, enabling the rendering performance of perspective to be improved.

Moreover, in the present exemplary embodiment, as illustrated in FIG. 4, regardless of the distance between the vehicle 12 and the object, the length of the superimposed image 80 in the vehicle vertical direction is displayed with a constant length. This enables the consistency of display to be maintained, enabling the user to easily understand an object ahead of the vehicle 12 based on the display of the superimposed image 80.

Although explanation has been given regarding the vehicle display control device 10 according to the exemplary embodiments, obviously various embodiments may be implemented within a range not departing from the gist of the present disclosure. For example, although the superimposed image is generated for an object that is present in the travel lane 70 of the vehicle 12 in the above-described exemplary embodiments, there is no limitation thereto, and the superimposed image 80 may be displayed for an object that is present outside the travel lane 70 or an object detected at a location where the travel lane 70 is not present.

Further, although an example in which an image is displayed at the display area 26 of the head-up display device 48 has been described, there is no limitation thereto. For example, a superimposed image may be displayed at a display or the like that is provided at the instrument panel. Namely, the superimposed image is displayed so as to be superimposed on an image capturing ahead of the vehicle 12, and is output to the display. Moreover, the display area may be a display of an external device or the like. For example, in a case in which the display may be a display of an operation device that is operated by an operator who remotely drives the vehicle 12 from a remote location, an image capturing ahead of the vehicle 12 is received by the operation device that is connected via a network, and a superimposed image is displayed on the received image. Accordingly, the user in the above-described exemplary embodiments may be an occupant inside a vehicle cabin or an operator at a remote location.

Moreover, in the above-described exemplary embodiments, any of various types of processors other than the CPU 30 may execute the processing that the CPU 30 executes by reading a program. Examples of such processors include a Programmable Logic Device (PLD) in which the circuit configuration can be modified post-manufacture, such as a Field-Programmable Gate Array (FPGA), or a specialized electric circuit that is a processor with a specifically-designed circuit configuration for executing specific processing, such as an Application Specific Integrated Circuit (ASIC). Further, the display processing and the image generation processing may be executed by one of these various types of processors, or may be executed by combining two or more of the same type or different types of processors, for example, the above-described processing may be executed by plural FPGAs, or a combination of a CPU and an FPGA, or the like. Moreover, a hardware configuration of the various processors is specifically formed as an electric circuit combining circuit elements such as semiconductor elements.

In addition, although various data is stored in the storage 36 in the above-described exemplary embodiments, there is no limitation thereto. For example, a non-transitory storage medium such as a compact disc (CD), a digital versatile disc (DVD), or universal serial bus (USB) memory may act as a storage section. In this case, various programs, data, and the like are stored in these storage media.

What is claimed is:

1. A vehicle display control device comprising:
a processor configured to:
recognize an object ahead of a host vehicle;
cause display of respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction; and
when a distance between the host vehicle and the object changes, cause display of the lengths of the superimposed images in the vehicle vertical direction to be constant, regardless of a change of the distance between the host vehicle and the object.

2. The vehicle display control device according to claim 1, wherein:
the processor is configured to change a distance between the respective superimposed images displayed at each side of the object in the vehicle width direction in accordance with a distance between the host vehicle and the object.

3. The vehicle display control device according to claim 1, wherein the processor is configured to:
in a case in which a plurality of objects are present ahead of the host vehicle in a range in which a distance to the host vehicle is less than a first distance, recognize the plurality of objects as a single superimposition target; and
cause display of respective superimposed images, having lengths in the vehicle vertical direction, at each side of the single superimposition target in the vehicle width direction, the superimposed images being spaced apart from each other in the vehicle width direction.

4. The vehicle display control device according to claim 3, wherein the processor is configured to:
after causing display of the superimposed images at each side of the single superimposition target, in a case in which a first object among the plurality of objects moves in a direction away from the host vehicle, and a distance between the first object and the host vehicle is equal to or greater than the first distance and less than a second distance, continuously recognize the plurality of objects as the single superimposition target.

5. A vehicle display control method, comprising:
recognizing an object ahead of a host vehicle; and
displaying respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction, wherein when a distance between the host vehicle and the object changes, the lengths of the superimposed images in the vehicle vertical direction are constant, regardless of a change of the distance between the host vehicle and the object.

6. A non-transitory computer-readable storage medium storing a program that is executable by a processor to perform processing, the processing comprising:

recognizing an object ahead of a host vehicle; and displaying respective superimposed images, having lengths in a vehicle vertical direction, at each side of the recognized object in a vehicle width direction, at a display area so as to be superimposed on a view ahead of the host vehicle, the superimposed images being spaced apart from each other in the vehicle width direction, wherein when a distance between the host vehicle and the object changes, the lengths of the superimposed images in the vehicle vertical direction are constant, regardless of a change of the distance between the host vehicle and the object.

* * * * *